US 6,660,100 B2

(12) United States Patent
Wiedemann

(10) Patent No.: US 6,660,100 B2
(45) Date of Patent: Dec. 9, 2003

(54) METHOD FOR REMOVING PAINT FROM PLASTIC PARTS

(76) Inventor: Peter Wiedemann, Salvatorweg 13, D-86633 Neuberg-Ried (DE)

(*) Notice: Subject to any disclaimer, the term of this patent is extended or adjusted under 35 U.S.C. 154(b) by 170 days.

(21) Appl. No.: 10/047,124

(22) Filed: Oct. 23, 2001

(65) Prior Publication Data

US 2002/0065423 A1 May 30, 2002

(30) Foreign Application Priority Data

Oct. 24, 2000 (DE) ......................................... 100 52 597

(51) Int. Cl.[7] ............................... B08B 3/04; B08B 7/04
(52) U.S. Cl. ............................... 134/6; 134/7; 134/10; 134/16; 134/19; 134/27; 134/28; 134/29; 134/38
(58) Field of Search ............................... 134/3, 6, 7, 10, 134/16, 19, 27, 28, 29, 38

(56) References Cited

U.S. PATENT DOCUMENTS

| 5,346,640 A | | 9/1994 | Leys |
| 5,454,985 A | | 10/1995 | Harbin |
| 5,468,779 A | * | 11/1995 | Yamamoto et al. ........ 521/46.5 |
| 5,578,135 A | * | 11/1996 | Lohr et al. .................... 134/7 |
| 5,696,072 A | | 12/1997 | Nercissiantz et al. |
| 5,932,530 A | | 8/1999 | Radu et al. |

FOREIGN PATENT DOCUMENTS

| DE | 40 37 562 | 8/1992 |
| DE | 43 44 582 | 6/1995 |

* cited by examiner

Primary Examiner—Zeinab El-Arini
(74) Attorney, Agent, or Firm—Collard & Roe, P.C.

(57) ABSTRACT

In a process for removing the paint from plastic components provided with coats of paint, the plastic components are first crushed to a bulk material size of the crushed plastic pieces. The plastic pieces are subsequently mixed with a paint removing agent reducing the adhesion of the coats of paint to the plastic pieces, and circulated by means of a conveyor screw. The paint removing agent is formed in this connection by an emulsion consisting of at least one benzyl-substituted alkanol and an alkyl-glycol acetate or N-alkyl-pyrrolidone with an aqueous lye, which can not be completely mixed. The mixing ratio for mixing the individual components is selected so that it is in the range of a mixing gap. After the paint removing agent has acted upon the painted plastic pieces, a solid substance is added to the paint remover so that the further steps of the method can be carried out in a dry state. The plastic pieces are subsequently loaded in a hammer mill in which the coats of paint of the plastic pieces swelled by the paint removing agent are knocked off.

19 Claims, 1 Drawing Sheet

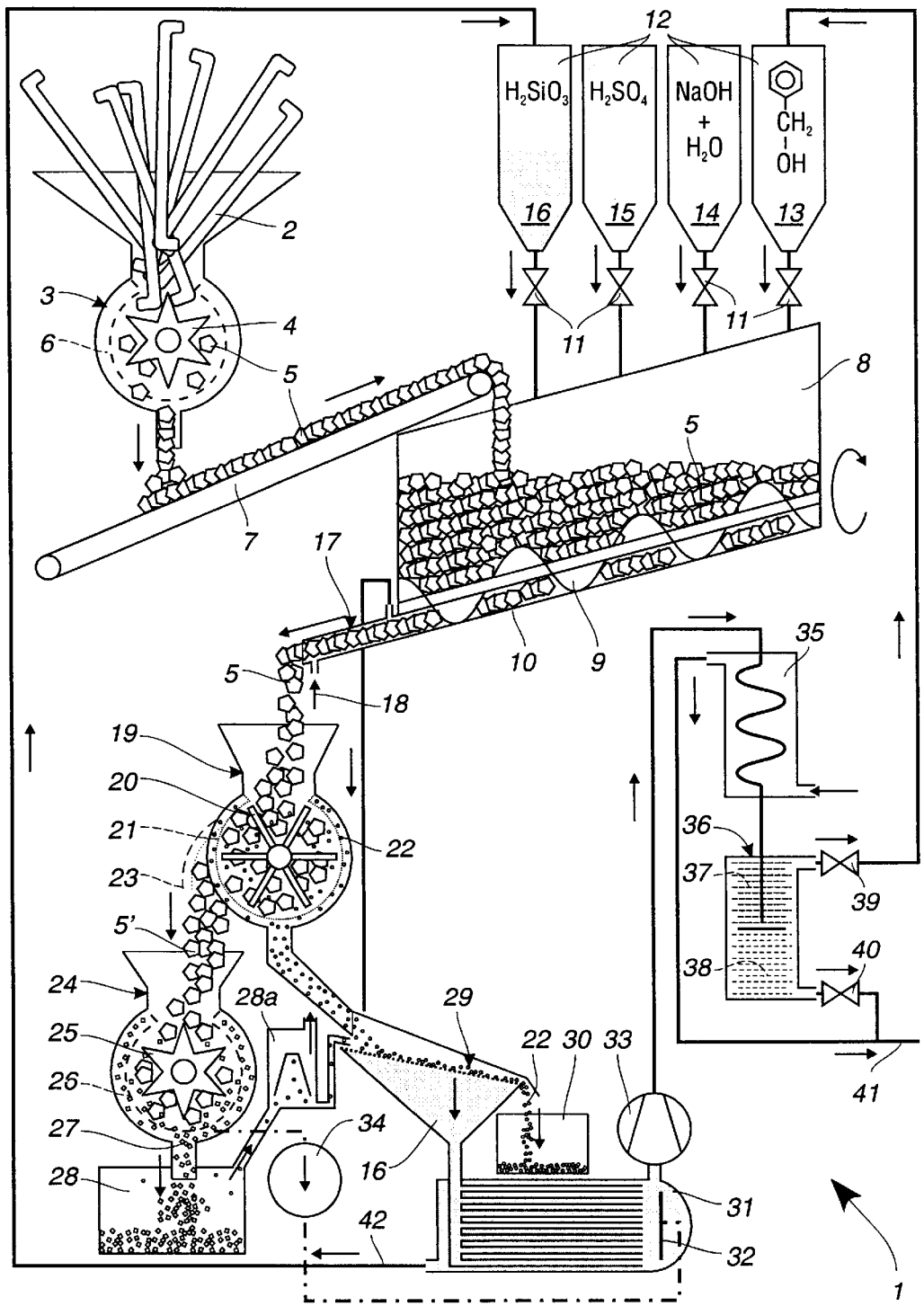

METHOD FOR REMOVING PAINT FROM PLASTIC PARTS

BACKGROUND OF THE INVENTION

1. Field of the Invention

The invention relates to a method for removing paint from plastic parts coated with layers of paint.

2. The Prior Art

A method for removing paint from painted plastic parts is known from German Patent No. DE 43 44 582 A1. In this known process, the plastic parts are first mechanically crushed and subsequently circulated at an elevated temperature jointly with alkalinized glycol and in the presence of chemically stable abrasive particles. The alkalinized glycol causes the paint to swell, so that its adhesive power to adhere to the plastic parts is reduced accordingly. Due to the circulation of the plastic parts together with the abrasive particles, the swollen paint is scraped off from the plastic parts, which are subsequently rinsed with water, dried, and then separated from the scraped off paint particles. This known method achieves adequate removal of paint for most of the commonly used coats of paint.

However, the required circulation time can be kept within justifiable limits only by heating the paint removing agent to temperatures in the range of 80° C. and 100° C. with high expenditure of energy, which requires substantial amounts of paint remover in relation to the bulk material of crushed plastic pieces. This is because customarily employed paint removers, in particular alkalinized glycol, only lead to very poor wetting of the surface of the paint, which substantially reduces the duration for which the paint remover effectively acts on the coats of paint vis-à-vis the actual duration of the whole process. Furthermore, the abrasive particles required in this known process have a considerable size, so that they have to be completely separated from the now-naked plastic particles with substantial expenditure if the quality of the new plastic parts produced from such plastic particles is not be impaired.

In order to separate the naked plastic pieces from the paint removing agent, the plastic pieces are rinsed with water and subsequently dried. This requires substantial amounts of water. Furthermore, this treatment procedure renders the required drying process very costly in terms of energy.

SUMMARY OF THE INVENTION

It is therefore an object of the invention to provide a process of the type specified above in which the expenditure of energy required for removing the paint from painted plastic parts is reduced.

In connection with the method defined by the invention, the plastic parts consisting of thermoplastic material and having coats of paint are first crushed to bulk size, whereby at least 90 percent by weight of all pieces have an overall length of less than 20 cm following the crushing step. The plastic part from which the paint is to be removed is destroyed in this way. However, such crushing offers the advantage that the transport and treatment measures known in the field of bulk material technology can be applied without any problems to the plastic bulk material so produced. Furthermore, the predominating number of plastic parts from which the paint has to be removed have defects that make it impossible to directly reuse the entire plastic part.

However, the size of the pieces is selected to be larger than about 3 mm, preferably larger than 10 mm in order to keep the enlargement of the surface area of the plastic parts small by the crushing process. It is possible in this way to keep the amount of chemicals required for wetting the surface of the plastic pieces small as well. The goal of the method of the invention is to recover the plastic mass of the plastic pieces free of paint in order to be able to produce new plastic parts by known methods and to then paint such parts without the coats of paint adhering thereto being in the way. Since plastic components are often coated with thermosetting plastic paints, it is practically impossible to dissolve the coat of paint directly because the cross-linkage of the paint polymer would have to be broken up in this case. This, however, would require chemicals that may possibly attack the thermoplastic part itself, which should be avoided. A paint removing agent is therefore added to the bulk material of plastic pieces and circulated together with such bulk material. The paint removing agent causes swelling of the coat of paint and thus reduces its adherence to the plastic pieces. After the paint removing agent has acted for an adequate length of time, the adhesion of the coat of paint has been reduced to such an extent that it can be easily knocked off from the plastic pieces.

After the paint removing agent has acted on the coat of paint of the plastic piece, the paint removing agent is no longer needed for carrying out the subsequent steps of the method. In fact, the paint remover would interfere with the removal of the coats of paint from knocking, because it would dampen the knocks accordingly. Furthermore, there is always the risk that the paint removing agent might damage other processing equipment installed downstream. It is therefore preferable if the paint removing agent is separated from the plastic pieces after it has acted on them. It is basically conceivable to wash the plastic pieces with a simple solvent, in particular with water. However, this requires very large amounts of water and energy in the subsequent step for drying the plastic pieces. It is simpler and more efficient, on the other hand, if the separation between the paint removing agent and the painted plastic pieces is carried out by adding a solid substance absorbing liquid. Such a solid substance can be easily separated from the plastic pieces, for example by screening without requiring any substantial expenditure of energy for that purpose. As the paint removing agent is stored in the interior of the solid substance, it is possible also to employ chemically aggressive paint removing agents without causing damage to the treatment equipment downstream by residues of the paint removing agent.

In order to keep the energy expenditure as low as possible, the paint removing agent employed according to the invention is an emulsion comprised of at least one benzyl-substituted alkanol, an alkyl-glycol acetate and/or an N-alkyl-pyrrolidone with an aqueous lye. These components can not be completely mixed. The mixing ratio of the substances is selected so that it is in the range of a mixing ratio of between 1:2 and 2:1. In this way, the alkanol, the acetate or the pyrrolidone are prevented from completely dissolving in the aqueous lye, so that the result is an emulsion. Such an emulsion possesses high viscosity vis-à-vis the pure substances or the solution, so that a pulpy mass is obtained.

This provides the paint removing agent with high adhesive power for adhering to the painted surfaces of the plastic pieces, so that the pieces are wetted even if they are disposed in the circulation process far above any possible level of the liquid. This results in the advantage that the plastic pieces are wetted by the paint removing agent throughout the duration of the circulation process, which means that a short duration of action of the paint removing agent of about 7 to 8 hours is obtained even near room temperature. This eliminates the necessity of having to heat the paint removing agent or the plastic pieces in the course of the circulation process, so that the required feed of energy is reduced accordingly.

It is also possible to carry out the process for swelling the coats of paint at an elevated temperature, which reduces the required duration of action of the paint removing agent if the temperature is raised only slightly. A temperature rise to about 60° C. is adequate for reducing the duration of action of the paint removing agent to a few minutes, which additionally results in substantial energy savings vis-à-vis the prior art. In addition, this results in the benefit that only a very small amount of paint removing agent of about 3 to 4% by weight of the fill of bulk material is required because the paint removing agent always precipitates in the form of a thin film. This means that it suffices to feed just as much paint removing agent that the plastic pieces are about uniformly wetted with the paint removing agent. Uniform wetting of the plastic pieces is achieved by circulating the plastic pieces, on the one hand, and by demixing the paint removing agent present in the form of an emulsion, on the other. In addition, the circulation could act on the plastic pieces in a scraping manner in order to detach the already swollen paint while the paint removing agent is acting on the plastic parts. This, however, is not necessarily required for carrying out the method in an effective manner.

The bumpers of motor vehicles are coated with highly impact-resistant, elastically yielding automotive paints in order to avoid damage to the lacquer from gravel impact. Such automotive lacquers are thermosetting paints, as a rule, which are applied to the plastic part on top of suitable primers for producing high power of adhesion. Such lacquers and primers are highly chemically stable as well. To remove the paint from such parts, it is advantageous if the emulsion contains benzyl alcohol, butyl-glycol acetate and/or N-methyl-pyrrolidone. These substances, moreover, offer the advantage that they have a relatively small molecule size, so that they can readily creep between the plastic parts and the coats of paint and thus effectively cause the coats of paint to swell.

Diluted soda or potash lyes have been successfully used for the lye component because these substances weaken the adhesive power of the paint adhering to the plastic parts in a particularly effective manner.

The paint removing agent as defined by the invention is basic, so that it can be disposed of in simple way via the sewer system. It is consequently necessary to neutralize the paint removing agent if such neutralization is carried out after the paint removing agent has acted on the plastic pieces by adding a neutralizing agent to the plastic pieces. This has the advantage that equipment installed downstream for treating the plastic pieces cannot be attacked by the basic milieu and possibly destroyed. This means that such processing devices can be made of favorably priced steel without reducing their useful life due to the action of the basic paint removing agent. An acid or a buffer solution has been successfully employed for neutralizing the paint removing agent. The acid acts substantially more effectively than the buffer solution if it is added to the amount of lye with the correct mixing ratio. No attention would have to be paid to the mixing ratio if a buffer solution is employed. However, the buffer is less efficient, so that a greater amount of neutralizing agent is required accordingly.

In order to obtain an adequate drying effect of the solid substance, it is important that such a substance has the largest possible active surface area. On the other hand, the required amount of solid substance should remain as small as possible in order to keep the costs of the process low. It has been found that solid substances having a surface area of at least 1 $m^2/g$ based on the mass are especially favorable for the method as defined by the invention. In combination with an addition of a small amount of solid substance to the plastic pieces, this results in an adequately high absorption effect of the solid substance for absorbing the paint removing agent.

It is basically very easy to separate the solid material from the plastic pieces by screening. However, individual particles of the solid substance may remain adhering to the plastic pieces. In order not to impair the repainting of a plastic component produced from the plastic pieces, the solid substance is preferably a powder with an average grain size of 20 $\mu$m at the most, preferably 1 $\mu$m at the most.

Precipitated silicic acid is preferably employed for absorbing the paint removing agent because it has a very large specific surface area of about 200 $m^2/g$ and, furthermore, a grain size of less than 1 $\mu$m. Due to such a small grain size, residues of silicic acid on the plastic pieces will not interfere in any way with the later repainting of plastic components produced from such parts. Active carbon does in fact have an even larger specific surface area of about 500 to 800 $m^2/g$. However, its grain size is relatively large, so that residues of active carbon on the plastic pieces may later interfere with the repainting under certain circumstances. Diatomaceous earth contains structures of minute living beings which cause it to have a substantial specific surface area of between 20 and 30 $m^2/g$ combined with a very small grain size. Soot, talcum powder or lime stone meal have a very small grain size of less than 1 $\mu$m and their specific surface area is in the order of 1 $m^2/g$, so that correspondingly larger amounts of the solid substance are needed for absorbing the paint removing agent.

If the paint removing agent and the solid substance are added in a closed container, the entire wet chemical process takes place exclusively in the container. This means that the entire remaining steps of the process can be carried out in the dry state, so that the processing devices employed downstream do not have to satisfy any requirements with respect to tightness and, furthermore, are not required to be equipped in any chemically resistant manner.

A uniform distribution of the solid substance through the bulk fill is obtained by circulating the plastic pieces together with the solid substance. This results in a uniform and almost complete removal of the paint remover, so that the subsequent treatment steps can be carried out in the dry state.

In order to keep residues of the paint removing agent that the solid substance has been unable to absorb away from the subsequent treatment equipment, the plastic pieces are subsequently dried. Such drying is preferably carried out via a wind sifting step in which the painted plastic pieces are subjected to a flow of a gas, particularly air blown through the plastic pieces from the bottom. Small particles, i.e. especially particles of the solid substance fully saturated with paint removing agent are carried along by the stream of gas, whereas the painted plastic pieces will remain in the wind sifting device. In this way, a separation takes place in addition to the drying process, which enhances the purity of the plastic recovered in the process accordingly. This is important particularly when the plastic components produced from the recovered plastic material are repainted.

Furthermore, it is possible in this way to recover at least part of the paint removing agent and possibly of the solid substance as well in order to reuse the materials so recovered.

The paint removing agent is capable only of swelling the paint or its primer without dissolving it because forming a solution is practically impossible in connection with thermosetting paints. To detach the paint from the plastic pieces, the paint is knocked off from the plastic pieces. A hammer or breaker plate mill that exerts knocks on the plastic pieces is preferably employed. Following an adequately long treatment of the plastic pieces in the hammer or breaker plate mill in the range of from 15 to 60 seconds, the plastic pieces are freed of the paint.

So that the naked plastic pieces can be reused without problems, it is important to separate the plastic from the paint particles and the solid substance absorbing liquid, so that a nearly pure plastic material is obtained. Such separation is preferably accomplished by screening because the plastic pieces are relatively large, whereas the knocked-off paint particles or the solid substance have a substantially smaller grain size. It is advantageous if a suitable sieve is already installed in the hammer or breaker plate mill in which the paint is knocked off from the plastic pieces. In a hammer mill so equipped, the paint particles removed from the plastic pieces, as well as the solid substance, but not the plastic pieces, are able to pass through the sieve. In this way, the plastic pieces are already separated from the paint or the solid substance in the hammer or breaker plate mill. So that the solid substance or the paint removing agent contained therein can be reused as well, it is advantageous if the solid substance is separated from the knocked-off paint, which is accomplished by screening as well. This is possible in an easy manner because the knocked-off paint particles have a substantially larger grain size than the solid substance. It is basically possible to install this sieve in the hammer or breaker plate mill as well, so that the latter separates the three fractions into "plastic pieces", "paint particles" and "solid substance". As an alternative, the paint particles can be separated from the solid substance in a screening device installed downstream. The paint particles collected in this manner have highly varying compositions because paints or lacquers consist of all kinds of different polymers, and small amounts of the plastic material are rubbed off in the treatment of the painted plastic pieces in the hammer or breaker mill as well, and are then received in or added to the paint fraction because of their small size.

Furthermore, the paints contain all sorts of different pigments, and thermosetting plastic to some extent as well, so that such plastics have to be disposed of. The naked plastic pieces may be reused either directly for producing new plastic components, or may be cut down first in a cutting mill to a grain size suitable for injection molding machines.

So as to be able to recover the paint removing agent and possibly also the solid substance, it is advantageous if the solid substance freed of the paint particles is heated to at least 70° C., preferably at least to 100° C. As the amount of solid substance is small in relation to the bulk fill of plastic pieces, the expenditure of energy required for this purpose is kept within justifiable limits. This elevated temperature partially evaporates the liquid absorbed in the solid substance from the latter, and this liquid can be subsequently condensed again for its recovery.

Especially if the paint particles are not to be separated from the solid substance, it is favorable if the solid substance loaded with the paint removing agent is heated to a temperature that is lower than the plasticizing temperature of the plastic pieces. The plastic pieces are in this way prevented from baking to the heating devices and thus from making it more difficult to carry out the method.

In order to keep the expenditure of energy for heating the solid substance low, it is favorable if the mechanical energy introduced for knocking off the paint from the plastic pieces is used for heating the solid substance. The solid substance is preferably heated by a heat pump that is supplied with the heat of the naked plastic pieces. It is possible in this way to advantageously use the substantial amount of heat contained in the naked plastic pieces for heating the solid substance, and to thus dispense with additional heat sources.

If the solid substance is additionally passed through a countercurrently operating heat exchanger with heating on the secondary side, the solid substance is heated in a particularly efficient manner with the lowest possible consumption of energy because the heat of the solid substance, which is at least partly freed of the liquid, is reused as well for heating the incoming solid substance.

Finally, it is favorable if the gas evaporating from the heated solid substance is removed by pumping it off. The atmospheric pressure is preferably reduced to about 100 to 500 mbar so as to assure that the evaporation from the solid substance is as effective as possible. The recovered vapor is preferably condensed in a cooler and subsequently separated in a phase separator into an oily and an aqueous phase, so that the organic component of the paint removing agent can be recovered for carrying out the method further. The aqueous phase contains water and a salt and can be discharged into the sewer system without problems.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

The single FIGURE shows a schematic representation of a device 1 for removing paint from plastic parts 2, which are represented only by way of example in the form of automotive bumpers. It is, of course, possible to remove the paint from any other painted plastic parts 2 with the help of device 1 as well.

DETAILED DESCRIPTION OF THE PREFERRED EMBODIMENT

Referring now in detail to the drawing, the FIGURE shows the painted plastic components 2, which are first charged in a cutting mill 3 in which they are crushed by the cutting tools 4 into the plastic pieces 5, which have the size of a plastic bulk material. Cutting mill 3 comprises a screen 6 which permits only plastic pieces 5 having a defined maximum size to pass through said screen. Plastic components 2 are crushed by cutting tools 4 until plastic pieces 5 have reached a preset maximum size allowing them to pass through screen 6. Screen 6 is adjusted in such a way that plastic pieces 5 have a maximum size of from about 2 cm to 10 cm, so that they can be transported and processed with the help of known bulk material conveying and processing techniques. However, the size of the plastic pieces is not selected unnecessarily small for the purpose of keeping the total surface area of plastic pieces 5 as small as possible, which is advantageous for the further implementation of the method.

The crushed, painted plastic pieces 5 are transported to and charged in a container 8 with the help of a transporting device 7, which is indicated in the FIGURE in the form of a conveyor belt. For optimizing the implementation of the method it is also possible to store plastic pieces 5 intermediately in order to allow cutting mill 3 to be operated as continuously as possible.

As soon as container 8 has been adequately filled with plastic pieces 5, a conveyor screw 9 is put into rotation, conveying the material in an inclined upward direction. Conveyor screw 9 is installed in the area of a bottom 10 of container 8 and provides for continuous circulation of plastic pieces 5 in container 8. Bottom 10 of container 8 is set at an acute angle in relation to the horizontal. Plastic pieces 5 are circulated in this manner in a favorable way, so that all plastic pieces 5 pass a number of times through the range of action of the conveyor screw 8.

Container 8 is connected with the supply containers 12 via valves 11. Benzyl alcohol 13, diluted soda lye 14, sulfuric acid 15 as well as the precipitated silicic acid 16 are stored in said supply containers 12 and can be fed into container 8 selectively or in combination.

Benzyl alcohol 13 and aqueous soda lye 14 are added to painted plastic pieces 5 first. It is unimportant in this connection whether the two liquids are admitted into container 8 at the same time or one after the other. The mixing ratio between benzyl alcohol 13 and aqueous soda lye 14 is selected in the range of a mixing gap of about 1:1, so that the two liquids 13 and 14 are prevented from forming a solution.

By circulating the liquids 13 and 14 in container 8 by means of conveyor screw 9, an emulsion is produced between benzyl alcohol 13 and aqueous soda lye 14. This emulsion has a substantially higher viscosity vis-à-vis liquids 13 and 14, so that it favorably adheres to the plastic pieces 5 as well as to their coats of paint because of its pulpy consistency. The amount of emulsion added is selected in this connection in such a way that the plastic pieces 5 are only wetted with the paint removing agent 13, 14. After the plastic pieces 5 have been completely wetted, only very small amounts of paint removing agent 13, 14 are left behind in the zone of the container bottom 10.

Paint removing agent 13, 14 attacks the coats of paint on the plastic pieces 5 and causes them to swell. This reduces the adherence of the coats of paint to plastic pieces 5. After a circulation time of approximately 8 hours without additional feed of heat, the paint on plastic pieces 5 has adequately swelled, so that it can be easily separated from plastic pieces 5 mechanically.

The paint is partially scraped off from plastic pieces 5 by a scratching effect exerted by conveyor screw 9. However, this is not necessary for carrying out the method. By circulating plastic pieces 5 with the help of the conveyor screw 9, plastic pieces 5 and the paint removing agent 13, 14 are slightly heated, whereby paint removing agent 13, 14 normally is heated not in excess of lukewarm. To accelerate the process, container 8 could be additionally heated, whereby even temperatures of only about 40° C. effect substantial swelling of the paint.

After the paint on plastic pieces 5 has adequately swelled, the basic paint removing agent 13, 14 is neutralized by adding the sulfuric acid 15. The required amount of sulfuric acid is determined based on the amount of soda lye contained in paint removing agent 13, 14. Paint removing agent 13, 14 is neutralized after paint removing agent 13, 14 has been circulated further for a short time, so that no materials resistant to lye are needed for the further treatment of the plastic pieces 5.

So that the next steps of the method can be carried out in a dry state, the neutralized paint removing agent 13, 14 is absorbed by adding the precipitated silicic acid 16 to plastic pieces 5. The silicic acid 16 is circulated together with plastic pieces 5 for a short time in order to uniformly mix the silicic acid and the plastic pieces. The precipitated silicic acid 16 has a very large specific surface, so that an amount of about 5 to 6 percent by weight of the total bulk fill suffices for absorbing the paint removing agent 13, 14.

The precipitated silicic acid 16 does in fact absorb the major part of paint removing agent 13, 14. However, a certain residual amount of moisture remains on the plastic pieces 5 that could make it more difficult to carry out the further steps of the method. The plastic pieces 5 are therefore removed from container 8 and supplied to a drying device 17 that is designed in the form of a wind sifting device. In this wind sifting device, the preferably heated air 18 is passed through plastic pieces 5 from the bottom. In this process, the air flow 18 carries along both moisture and the major part of the precipitated silicic acid, whereas the plastic pieces 5 remain behind in the drying device 17.

After the drying step has been completed, plastic pieces 5 are loaded in a hammer mill 19, in which the swollen paint is knocked off from plastic pieces 5 with the beaters 20. A screen 21 is arranged around beaters 20. Screen 21 has a mesh width of about 3 mm, so that plastic pieces 5 are safely retained within screen 21. The knocked off paint particles 22, however, can pass through the screen and are in this way separated from the plastic pieces 5 together with the silicic acid 16 still present. Hammer mill 19 comprises a flap door 23, which is indicated in the figure by a dashed line. The naked plastic pieces 5' can be removed from hammer mill 19 via flap door 23.

The naked plastic pieces 5' are subsequently introduced into a cutting mill 24, in which they are crushed to the desired grain size of about 2 to 8 mm. Said cutting mill is equipped with cutting tools 25 which are radially surrounded by a sieve 26. Sieve 26 has a mesh width of about 8 mm, so that a plastic granulate 27 is produced that has an adequate grain size for processing such granulate, for example on injection molding machines. Plastic granulate 27 is collected in containers 28 and is a valuable raw material for manufacturing the new plastic parts 2. A dust removal device in the form of a cyclone 28*a* is associated with container 28 and separates any paint particles 22 or solid substances 16 that might still be present.

The fine particles, which were separated from the plastic pieces 5 in drying and wind sifting device 17, and in the hammer mill 19 and the cyclone 28*a*, are fed into a screening device 29 in which they are separated into a coarse fraction and a fine fraction. Paint particles 22 are relatively coarsely grained versus the finely powdery silicic acid 16, so that paint particles 22 can be separated in this way from the silicic acid 16.

Paint particles 22 consist of a great variety of different substances and also contain thermosetting polymers whose reuse would be uneconomical. Furthermore, the collected amount of paint particles 22 is relatively small because the coats of paint are very thin, so that paint particles 22 are collected in a waste bin 30 for waste disposal. Paint particles 22 could also be supplied to a refuse incineration plant in order to make use of the chemical energy contained in these particles.

The precipitated silicic acid 16 is fully impregnated with the absorbed paint removing agent 13, 14, so that said acid is a valuable raw material. In order to recover benzyl alcohol 13 from the silicic acid 16, the latter is heated first in a countercurrently operating heat exchanger 31 and subsequently by a heating device 32, to a temperature of about 100° C. In addition, the ambient atmosphere is diluted by a vacuum pump 33 to a pressure of from about 50 to 500 mbar, so that the liquid contained in the precipitated silicic acid 16 is efficiently evaporated from the latter. The evaporation cold generated in this process is compensated by heating device 32.

It is possible to employ any type of heating device 32. However, in the present case, it is favorable to use by means of a heat pump 34 the substantial amount of heat contained in the naked plastic pieces 5' coming from the hammer mill 19. Heat pump 34 extracts from the naked plastic pieces 5 the heat contained in these plastic pieces in order to heat the precipitated silicic acid 16 to about 100° C., whereby the amount of heat required for evaporating the liquid from the precipitated silicic acid 16 is substantially smaller than the amount of heat contained in plastic pieces 5'.

The vapor compressed by vacuum pump 33 is condensed in a cooler 35 and subsequently supplied to a phase separator 36 located near the center of the container, with no agitator gear or the like being installed in the container. The liquid separates into two phases in the course of time, whereby an oily phase 37 is floating on an aqueous phase 38. The aqueous phase 38 contains water and Glauber's salt that has been produced in the neutralization reaction between the soda lye 14 and the sulfuric acid 15. Aqueous phase 38 can be discharged into the sewer system without any problem.

On the other hand, oily phase 37 consists of the pure benzyl alcohol 13 that is fed into the respective supply container 12 via a valve 39. In order to prevent oily phase 37 from getting into the waste water, aqueous phase 38 is connected with a waste water conduit 41 via another valve 40.

If the separation of the paint particles 22 from the precipitated silicic acid 16 in screening device 29 exhibits an adequate quality and the precipitated silicic acid 16 has been relieved of the liquid contained in it by at least 50%, the precipitated silicic acid 16 can be reused as well. For this purpose, the countercurrently operating heat exchanger 31 is connected via a conduit 42 with the respective supply container 12 for silicic acid 16.

In this way, all substances employed with the exception of the soda lye and the sulfuric acid that combine to form water and Glauber's salt, are recycled into the circulation. The collected waste substances can be disposed of to some extent directly via the waste water conduit 41 or submitted to waste incineration. The major proportion of the painted plastic components 2 is recovered as a valuable raw material in the form of a plastic granulate 27, from which new plastic components 2 can be produced. The entire paint removal process requires a surprisingly small amount of energy, so that said method is highly compatible with the environment as well.

Accordingly, while only a single embodiment of the present invention has been shown and described, it is obvious that many changes and modifications may be made thereunto without departing from the spirit and scope of the invention.

What is claimed is:

1. A method for removing the paint from plastic components provided with coats of paint, comprising:

crushing the plastic components to bulk size pieces;

mixing the pieces with a paint, removing agent that reduces adhesion of the coats of paint;

circulating the pieces together with said paint removing agent; and adding a solid substance which absorbs the paint removing agent from the pieces after the pieces have been acted upon by the paint removing agent.

2. The method according to claim 1, wherein the paint removing agent comprises an emulsion comprising an aqueous lye with at least one substance selected from the group consisting of a benzyl-substituted alkanol, an alkyl-glycol acetate and an N-alkyl-pyrrolidone wherein a mixing ratio of the aqueous lye to the at least one substance selected from the group consisting of a benzyl-substituted alkanol, an alkyl-glycol acetate and an N-alkyl-pyrrolidone is such that the at least one substance selected from the group consisting of a benzyl-substituted alkanol, an alkyl-glycol acetate and an N-alkyl-pyrrolidone does not dissolve in the aqueous lye.

3. The method according to claim 2, wherein the emulsion contains at least one substance selected from the group consisting of benzyl alcohol, butyl-glycol acetate and N-methyl-pyrrolidone.

4. The method according to claim 2, wherein the emulsion contains at least one substance selected from the group consisting of soda lye and potash lye.

5. The method according to claim 2, further comprising the step of adding an acid to the plastic pieces after said pieces have been acted on by the paint removing agent to neutralize the paint removing agent.

6. The method according to claim 2, further comprising the step of adding a buffer solution to the plastic pieces after said pieces have been acted on by the paint removing agent to neutralize the paint removing agent.

7. The method according to claim 1, wherein the solid substance has a surface area of at least 1 $m^2/g$ based on mass.

8. The method according to claim 1, wherein the solid substance has an average maximum grain size of 20 $\mu m$.

9. The method according to claim 1, wherein the solid substance contains at least one substance selected from the group consisting of precipitated silicic acid, active carbon, diatomaceous earth, soot, talcum powder and line stone meal.

10. The method according to claim 1, wherein the paint removing agent and the solid substance are added to the painted plastic pieces in a closed container.

11. The method according to claim 1, wherein the solid substance is circulated together with the plastic pieces.

12. The method according to claim 1, further comprising the step of drying the plastic pieces after the paint removing agent has been absorbed by the solid substance.

13. The method according to claim 1, further comprising the step of knocking the paint off from the plastic pieces after the paint removing agent has been absorbed by the solid substance.

14. The method according to claim 1, wherein the solid substance and the paint are separated from the plastic pieces by screening.

15. The method according to claim 1, further comprising the step of heating the solid substance, wherein a vapor exiting from the solid substance is condensed for at least partly recovering the paint removing agent.

16. The method according to claim 15, wherein the solid substance is heated to a temperature lower than a plasticizing temperature of the plastic components.

17. The method according to claim 15, wherein energy is introduced into the plastic pieces for knocking off the paint and said energy is used for heating the solid substance, and wherein the solid substance is heated by a heat pump supplied by heat of the plastic components.

18. The method according to claim 15, wherein the solid substance is supplied to a countercurrently operating heat exchanger with heating on a secondary side.

19. The method according to claim 15, wherein the vapor exiting from the heated solid substance is pumped off and condensed.

* * * * *